United States Patent [19]

Belmont

[11] Patent Number: 5,594,879
[45] Date of Patent: Jan. 14, 1997

[54] METHOD OF AND APPARATUS FOR ARBITRARILY DISABLING UNDER PROCESSOR CONTROL INDIVIDUAL SLOTS ON A COMPUTER BUS

[75] Inventor: Brian V. Belmont, Houston, Tex.

[73] Assignee: Compaq Computer Corporation, Houston, Tex.

[21] Appl. No.: 541,225

[22] Filed: Oct. 12, 1995

Related U.S. Application Data

[63] Continuation of Ser. No. 145,400, Oct. 29, 1993, abandoned.

[51] Int. Cl.$^6$ ................................................ G06F 13/40
[52] U.S. Cl. ........................ 395/309; 395/281; 395/822
[58] Field of Search .................................. 395/822, 823, 395/828, 829, 856, 281, 284, 309

[56] References Cited

U.S. PATENT DOCUMENTS

| | | | |
|---|---|---|---|
| 4,951,248 | 8/1990 | Lynch | 395/402 |
| 4,999,805 | 3/1991 | Culley et al. | 395/282 |
| 5,109,517 | 4/1992 | Houda et al. | 395/800 |
| 5,111,423 | 5/1992 | Kopec, Jr. et al. | 395/500 |
| 5,161,102 | 11/1992 | Griffin et al. | 395/800 |
| 5,237,690 | 8/1993 | Bealkowski et al. | 395/700 |
| 5,257,387 | 10/1993 | Richek et al. | 395/800 |
| 5,317,721 | 5/1994 | Robinson | 395/500 |
| 5,345,564 | 9/1994 | Jensen et al. | 395/823 |
| 5,353,432 | 10/1994 | Richek et al. | 395/500 |
| 5,367,640 | 11/1994 | Hamilton et al. | 395/829 |

OTHER PUBLICATIONS

Uffenbeck, John, "Microcomputers and Microprocessors: The 8085, 8080, and Z–80 Programming, Interfacing and Troubleshooting". 1985, pp. 202–211.

Micro Channel Architecture, Nov. 1987, pp. 2–8 to 2–16, 2–29, 2–43 to 2–51.

Intel Corporation/Microsoft Corporation Plug and Play ISA Specification, Version 1.0 (May 28, 1993).

Eisa Specification, Appendix to U.S. Pat. No. 5,101,492, issued Mar. 31, 1992 to Schultz, et al., pp. i–xi, 1–54, 97–212, 294–304, 356–399.

Primary Examiner—Parshotam S. Lall
Assistant Examiner—Viet Vu
Attorney, Agent, or Firm—Pravel, Hewitt, Kimball & Krieger

[57] ABSTRACT

The system bus in a computer system includes a number of slots for individual expansion cards. Generally, input/output and memory operations to those expansion cards enable all the cards when one addressing range is used, but only enable one of the cards when another addressing range is used. According to the invention, any particular card can be disabled, or any combination of cards can be disabled, no matter which address range is used for the input/output or memory operation. This allows each card to be individually checked at start up to determine its I/O address and memory range without the possibility of another card responding, even if that other card is configured to respond to the same addresses.

15 Claims, 2 Drawing Sheets

METHOD OF AND APPARATUS FOR ARBITRARILY DISABLING UNDER PROCESSOR CONTROL INDIVIDUAL SLOTS ON A COMPUTER BUS

This is a continuation of application Ser. No. 08/145,400, filed on Oct. 29, 1993, now abandoned.

RELATED APPLICATIONS

This application is related to co-pending Ser. No. 08/145,338, filed Oct. 29, 1993, entitled "Method of Determining the Configuration of Devices Installed on a Computer Bus," and to co-pending Ser. No. 08/145,339, filed Oct. 29, 1993, entitled "Detecting the Presence of a Device on a Computer System Bus by Measuring the Response Time of Data Signals on the Bus, and Maximizing System Performance Based on that Response Time," all of which have been assigned to the assignee of this application.

BACKGROUND OF THE INVENTION

1. Field of the Invention

The invention relates to computer busing systems, and more particularly to a method of and apparatus for individually disabling specific slots independent of the address asserted on the system bus.

2. Description of the Related Art

The microcomputer industry has experienced tremendous growth over the last twenty years. From the days of its infancy when only a few interested "hackers" could fathom its quirks and nuances, the microcomputer has now evolved into a powerful business and personal tool found on virtually every office desk and in virtually every home.

The microcomputer's road to success has not been without its problems, however. While advances occur at an astounding pace, those advances must accommodate the standards found in the then existing base of microcomputer systems. This is known as upwards compatibility. To maintain such compatibility, the industry has seen one microcomputer standard laid on top of another, with a resulting hodgepodge of standards-within-standards that designers must maintain to allow existing users to upgrade their equipment. These multiple standards gradually shed their oldest layers, replacing them with new layers reflecting the state-of-the-art. In this way, only the very oldest microcomputer systems become obsolete.

One early idea to enhance microcomputer systems was the addition of hardware enhancing cards. These cards were generally plugged into a system bus to provide added functionality, such as telecommunications, disk storage, and improved video. These cards obviously had to conform to some standard. With the introduction of the IBM PC by International Business Machines Corp., and the later introduction of the PC/AT by IBM, the AT system bus soon became a de facto standard known as the Industry Standard Architecture bus, or the ISA bus. The AT bus accommodated both the 8-bit cards of the PC and newer 16-bit cards developed for the AT. Third-party manufacturers could economically design standard cards compatible with the wide variety of IBM PC and AT compatible microcomputer systems.

Further advances in microprocessor technology, however, pushed the ISA bus to its limits. For this reason, another "layer" was added to the ISA bus standard. This added layer became known as the Extended Industry Standard Architecture bus, or the EISA bus. Cards designed for the EISA bus had more pins, providing a wider data path for information to flow through the microcomputer system bus, analogous to adding lanes to a highway. The EISA bus also added more address lines to the standard, permitting more memory locations to be individually specified, much as would adding more digits to a phone number or a zip code.

Along with its improved information pathways, however, the EISA bus brought certain problems. The EISA bus standard had to accommodate existing ISA cards to provide upwards compatibility. The ISA bus, however, not only had fewer data and address lines, but also had only enough control lines to handle the smaller size of those data and address lines. The broader data and addressing width of the EISA bus demanded more control signals. This resulted in a two-layer standard.

While the ISA standard provided 16 bits of I/O addressing, in developing cards for PC-compatible computers, vendors often only used or decoded the lower 10 bits. Thus, to be fully compatible with the available cards, the I/O address space of the ISA bus effectively was only from 0 to 03FFh. Thus, a large portion of the I/O space was unusable.

Another limitation of the ISA bus involved its method of handling I/O and memory addressing. An address enable signal (AEN) was driven low by an ISA bus master to indicate to all of the cards that the currently asserted address was an I/O address or a memory address rather than a direct memory access (DMA) operation. But because AEN was asserted low to all cards, each card had to be physically configured to respond to a different range of I/O and memory addresses to avoid conflicts. This address differentiation was usually accomplished when installing the boards by setting microswitches on dual in-line packages (DIP) or by connecting jumpers on each board. Improperly setting these switches could result in conflicts on a read or write to a particular I/O and memory address and could even result in physical hardware damage.

The EISA bus standard has resolved this problem to some extent. The EISA bus definition provides for a conflict-free I/O address space for each slot. This is fully described in U.S. Pat. No. 4,999,805, and the EISA Specification, Version 3.1, which is Appendix 1 of U.S. Pat. No. 4,101,492, both of which are hereby incorporated by reference. The expansion board manufacturers include a configuration file with each EISA expansion board, and optionally, with switch programmable ISA products. A configuration utility program provided by the system manufacturer uses the information contained in the configuration files to determine a conflict-free configuration of the system resources. The configuration utility stores the configuration and initialization information into non-volatile memory and saves a backup copy on diskette. Details of this configuration process are provided in Ser. No. 07/293,315, entitled "Method and Apparatus for Configuration of Computer System and Circuit Boards," allowed on May 10, 1993, which is hereby incorporated by reference. The system ROM power up routines use the initialization information to initialize the system during power up, and device drivers use the configuration information to configure the expansion boards during operation.

Expansion boards install into EISA and ISA bus connectors. Each bus connector is referred to as a slot. The bus connectors are numbered sequentially from 1 to "Z" (with 14 as the maximum "Z"). For example, an EISA system with 7 bus connectors has slots numbered from slot 1 to slot 7. Slots 0 and 15 are reserved for the system board. The system board mounts the slot connectors and can also include individual EISA or ISA devices of its own.

An EISA bus controller on the system board has I/O address decoding hardware that provides each EISA slot with a unique, 1,024 byte, slot specific I/O address space. The slot specific information is decoded as follows. EISA systems reserve I/O spaces at 0Z00h-0Z0FFh, 0Z400h-0Z4FFh, 0Z800h-0Z8FFh, and 0Zc00h-0ZcFFh for slot specific I/O slaves on ISA and EISA expansion boards. These address ranges do not conflict with ISA board I/O addresses because they alias ISA system board I/O address space. EISA system boards must fully decode system board I/O accesses to ensure they do not alias with slot specific I/O slaves. The system board uses the slot specific I/O range where "Z" is 0 or 15 for all system I/O devices.

The system board disables the slot specific I/O ranges to the non-selected slot by asserting a slot specific bus signal AENx high (where "x" is the slot number) if the address "Z" does not match the slot number and the least significant 12 address bits address a slot specific range (0Z00h-0Z0FFh, 0Z400h-0Z4FFh, 0Z800h-0Z8FFh, 0Zc00h-0ZcFFh). Expansion boards that take advantage of the slot specific I/O ranges must, at a minimum, decode the LA[8] and LA[9] address bits to "0" with AENx negated (low) to assure they do not alias with ISA expansion board I/O. This is all more fully detailed in U.S. Pat. No. 4,999,805, and in the EISA Specification Version 3.1, both of which are above incorporated by reference.

A problem with both the ISA and EISA specifications is that there is no way to prevent conflicts between ISA boards residing in the same non-slot specific I/O address space or residing in the same memory space. When an ISA expansion board I/O or memory address is accessed and that address is occupied by two ISA boards, both will attempt to drive the data bus in response to that address. This is because on accesses to ISA I/O addresses or memory addresses, all of the AENx bus signals are asserted low. This, of course, can lead to both unpredictable and undesirable results. Thus, it would be desirable to determine the possibility of such conflicts before they occur.

Further, it is difficult to determine in which slot a card using ISA I/O addressing or containing memory is located. EISA cards are readily located and their identity determined by reading defined slot specific registers. But no such registers exist for ISA cards. This, combined with all the AEN or AENx signals being asserted low on ISA slot space accesses, renders it effectively impossible to simply provide a given address and look for a response, as the responding unit could be located in any slot and all the responses would be identical. Thus, it is also desirable to be able to determine the location of the particular board for configuration purposes.

SUMMARY OF THE INVENTION

In a microcomputer system constructed according to the apparatus and method of the invention, the system bus includes selectible slot specific address enable signals to each slot on the system bus for the entire range of I/O and memory addresses. Before the invention, an access on that system bus to certain address ranges would result in all of the address enable lines being driven to an asserted state indicating an I/O or memory operation, as in ISA systems or the memory and ISA I/O addresses in EISA systems. In a device according to the invention, however, a register is provided containing a mask of which particular slots or devices are to be activated by an I/O or memory operation, even if the address is one which typically causes all of the address enable lines to be asserted. The outputs of the mask register are "ORed" with the standard slot enable outputs, forcing a board inactive if the mask register output is high.

When the corresponding bit in the register is not set to mask a particular slot or device, that slot or device responds normally to addresses, in ISA systems always being addressed, and in EISA systems either being selectively addressed when certain slot specific I/O address ranges are invoked, or always addressed when certain non-slot specific address ranges are invoked. Only when the register is set to mask a particular slot or device is that particular slot or device never accessed for an I/O or memory operation.

This allows each particular slot or device to be checked for conflicts against other slots or devices without an actual address conflict occurring. This also allows determination of the particular slot in which a device or card is located.

DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

Figure 1:
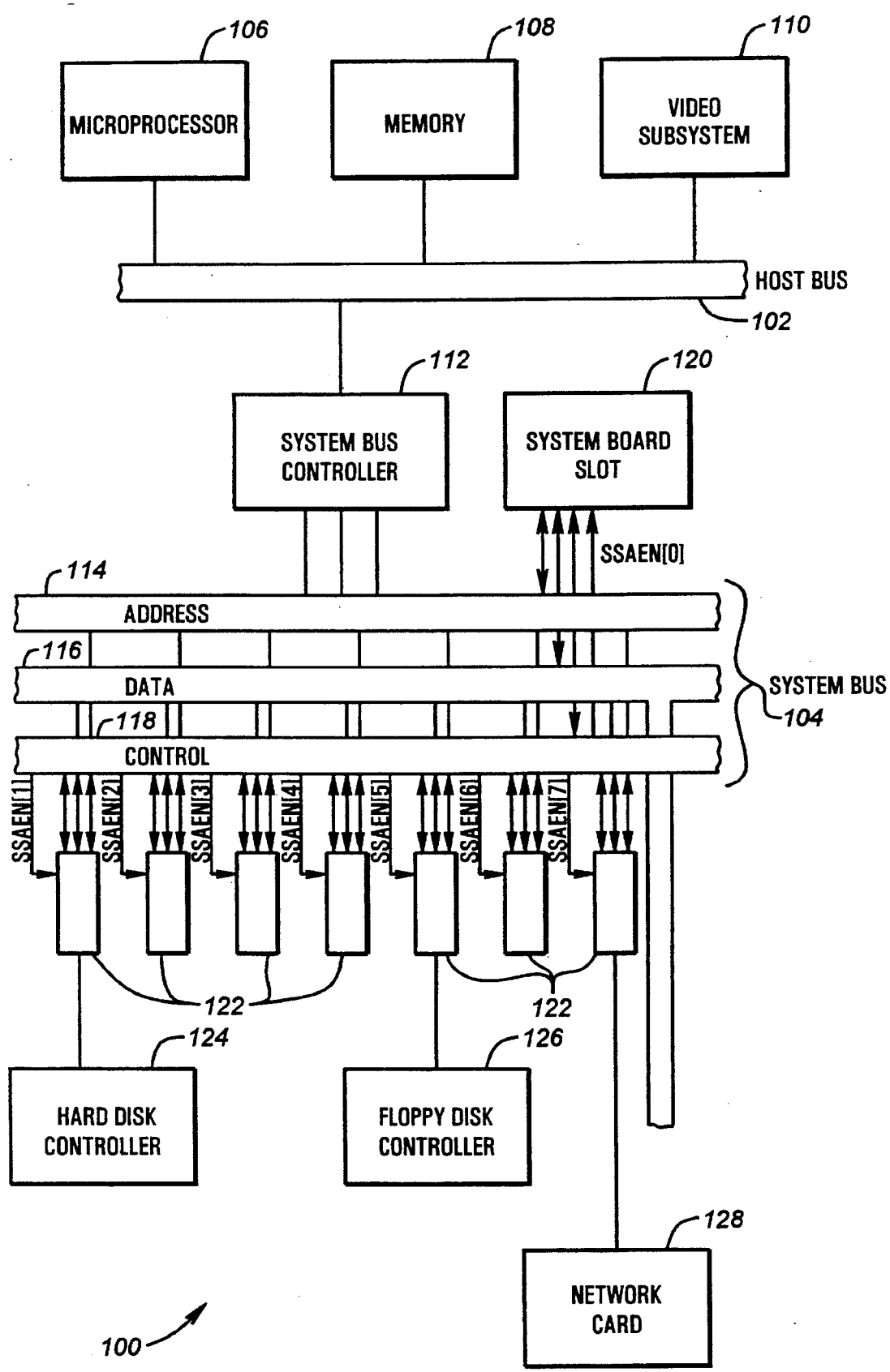
FIG. 1 is a block diagram or a computer system incorporating the method and apparatus according to the invention.

Turning now to the drawings, FIG. 1 is a block diagram of a microcomputer system 100 in which the method and apparatus according to the invention is implemented. The microcomputer system 100 includes a host bus 102 and a system bus 104. A microprocessor 106, memory 108, and a video subsystem 110 internally communicate at high speed with each other over the host bus 102. The host bus 102 is designed for speed rather than expansion, so the host bus 102 has little, if any, provision for expansion boards.

A system bus controller 112 provides an interface between the host bus 102 and system bus 104. The system bus controller 112 is located on the system board of the microcomputer system 100. The system bus controller 112 is preferably implemented using an application specific integrated circuit (ASIC) but could be implemented as discrete components.

The system bus 104 is typically an EISA bus, but could be another bus using similar addressing protocols. The system bus controller 112 implements the functions of an EISA bus controller. It is also within the system bus controller 112 that the slot disabling according to the invention is preferably implemented.

The system bus 104 consists of address lines 114, data lines 116, and control lines 118. Connected to the system bus 104 is a system board slot 120. The system board slot 120 is not a separate physical connection, but instead logically connects "devices" integrated into the system board of the microcomputer system 100 itself. Further connected to the system bus 104 are slots 122. The slots 122 are physical connectors for inserting expansion cards compatible with the standard of the system bus 104 to provide the added functionality to the microcomputer system 100. Shown inserted in the first, fifth, and seventh of the slots 122 are respectively a hard disk controller 124, a floppy disk controller 126, and a network interface card 128.

Each device connected to the system bus 104, whether a device corresponding to the system board slot 120 or a device plugged into one of the slots 122, includes an individual slot specific address enable line SSAEN[Z], where Z equals 0 to 7 in the disclosed embodiment. These SSAEN[Z]signals correspond to the AENx signals of the EISA specification, but further implement slot specific disabling according to the invention. This leads to a distinction between EISA and ISA systems. When the microprocessor 106 performs a memory operation or an I/O operation in the ISA expansion board address space, all of the lines SSAEN [Z] on an ISA or EISA bus are driven low assuming no disabling. The individual cards must then distinguish between appropriate addresses. When an EISA address is asserted, however, the system bus controller 112 only asserts a single line SSAEN[Z] low corresponding to the specific connector being addressed, again assuming no disabling. Thus, under the EISA standard, each slot can be individually addressed through its EISA I/O address range, or all devices can be simultaneously addressed using the memory space or the ISA expansion board address space. In the latter two cases, it is up to the user to configure each card for a different address range. Otherwise, two ISA devices could conflict. Neither the EISA standard nor the ISA standard provides for individual addressing of ISA boards plugged into specific slots.

Figure 2:
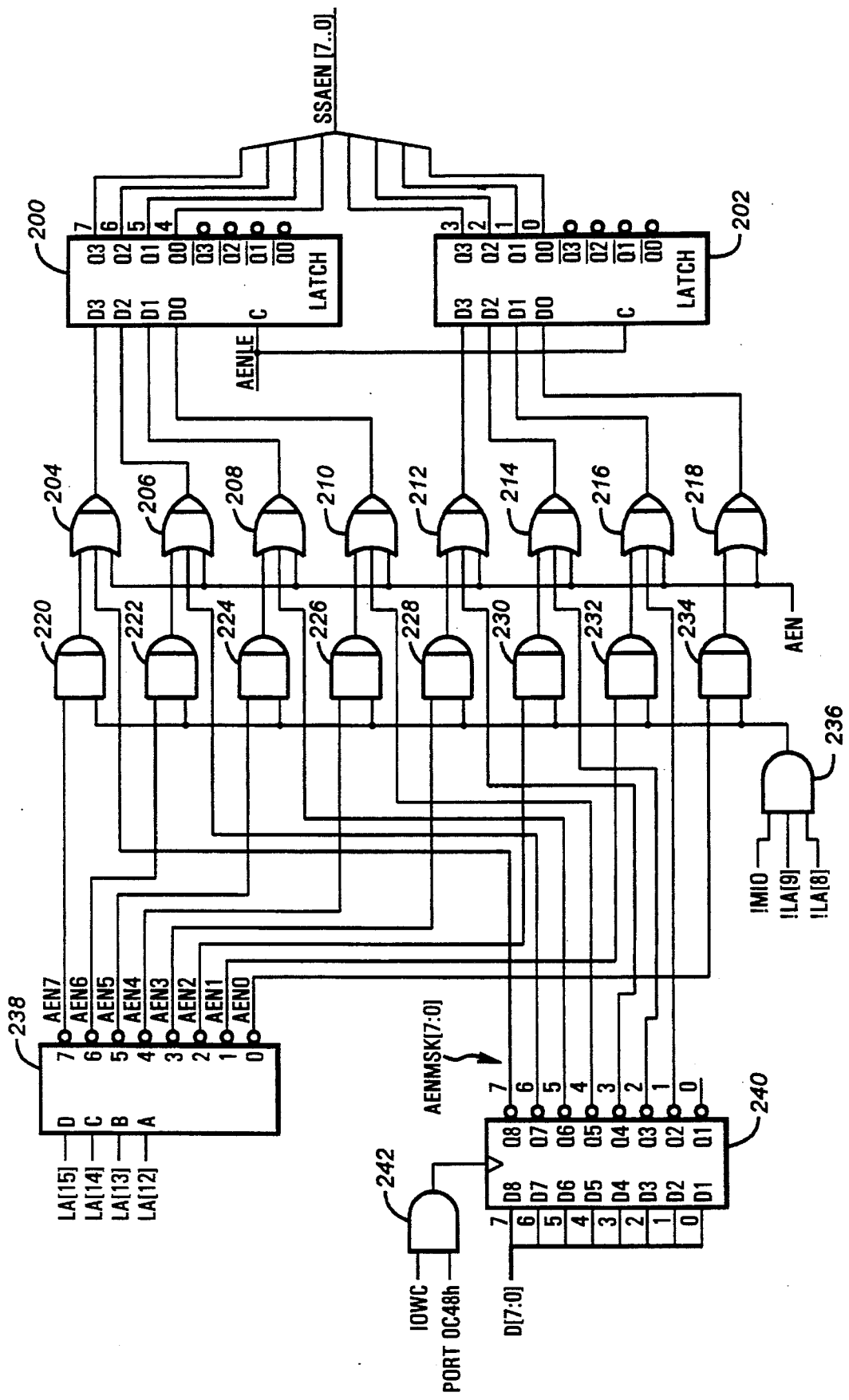
FIG. 2 is a schematic illustration of circuitry used to implement the selective disabling of slots according to the method and apparatus of the invention.

FIG. 2 is a schematic of a circuit implementing the individual slot disabling according to the invention. The circuitry shown in FIG. 2 is preferably implemented as part of the application specific integrated circuit (ASIC) also implementing the functions of the system bus controller 112. Though it could be implemented as discrete logic, that would be far less cost efficient, so the ASIC implementation is preferred.

The previously discussed signals SSAEN[7..0] are provided by two latches 200 and 202. An address latch enable signal AENLE provides the gating for the latches 200 and 202. The use and generation of AENLE is well known to those of ordinary skill in the art, and can be found, for example, in the description of the 82358DT EISA Bus Controller by Intel Corp., which is found in Intel's 1992 Peripheral Components Databook at page 1–343.

As stated above, when the outputs SSAEN[7..0] are high, the cards in the slots 122 or system board in the case of slot 120 to which each signal is provided will not decode the address asserted on the system as an I/O or memory operation. Only when the corresponding SSAEN[Z] signal is low does the associated device, if present, decode the address to determine whether the I/O or memory operation is directed to that device.

The latches 200 and 202 receive their inputs from a series of OR gates 204, 206, 208, 210, 212, 214, 216, and 218. One input to the OR gates 204–218 is an address enable signal AEN. A state machine in the system bus controller 112 asserts this signal low in response to programmed I/O or memory cycles as opposed to direct memory access (DMA) on the system bus 104. The generation of this signal is well known to those of ordinary skill in the art. As can be seen, when AEN is high, or when no I/O or memory read or write is occurring, the outputs of the OR gates 204–218 correspondingly go high. This causes the outputs of the latches 200 and 202 to be latched high on AENLE. This in turn causes all of the signals SSAEN[7..0] to be high, properly indicating to the connected devices that no programmed I/O or memory operation is occurring.

The second input to each of the OR gates 204–218 is provided by the outputs of corresponding AND gates 220, 222, 224, 226, 228, 230, 232, and 234. For each of these AND gates 220–234 that goes high, the corresponding OR gate 204–218 and corresponding SSAEN[7..0] signal go high, deselecting the corresponding slot 122 and its associated device, if any, or system board slot 120. If the output of one of these AND gates 220–234 is low, then the corresponding slot 122 may be selected by a low SSAEN[7..0] signal, depending on the states of AEN and the other input (discussed later) to the corresponding OR gate 204–218.

All of the AND gates 220–234 have as one input the output of a single AND gate 236. Obviously, if the output of the AND gate 236 is low, the outputs of all of the AND gates 220–234 are low, allowing the outputs of the OR gates 204–218 to go low unless one of their other inputs is high. The output of the AND gate 236 is a combination of a memory-I/O signal MIO, a latched address line LA[9], and a latched address line LA[8]. MIO is present among the control lines 118 of the system bus 104, while the latched address lines are present among the address lines 114 of the system bus 104. MIO is high when the current cycle is a memory cycle and low when the current cycle is an I/O cycle.

The latched address lines LA[9..8] correspond to the upper two significant bits of the lower 10 bits of I/O addressing effectively used by the ISA bus. When these two bits are zero, the address corresponds to a system board address in an ISA system. No plug-in boards use such addresses, because otherwise they might conflict with the system board addresses of the system itself. The EISA bus standard uses these two bits and the fact that they would always be directed to the system board to provide extended addressing for EISA boards. When LA[9..8] equal zero, this corresponds in an EISA system to an EISA slot specific address access. The slot number equals the value of LA[15..12], also present among the address lines 114. If LA[15..12] equal zero, this again corresponds to an access to the system board slot 120. Otherwise, it corresponds to an access to a specific slot 122 on the system bus 104.

The output of the AND gate 236 is equal to the equation:

$$!MIO \cdot !LA[9] \cdot !LA[8]$$

When true, this equation indicates that the current access is an I/O access addressing an EISA slot specific address. Then the other input to the AND gates 220–234 will control the outputs of those AND gates 220–234, allowing for slot specific EISA addressing.

If the output of the AND gate 236 is low, this indicated either that the current operation on the system bus 104 is a memory operation or that the I/O address is to an ISA expansion board address. In that case, all of the AND gates 220–234 go low, as slot specific EISA addressing is not used.

The other inputs to the AND gates 220–234 are slot specific AENx signals provided by a decoder 238. These outputs correspond to the AENx outputs of the EISA specification. The decoder 238 decodes the values on the address lines LA[15..12]. When LA[9..8] equals zero, and MIO is false (meaning an I/O access to an EISA board), the output of the AND gate 236 is high. The outputs of the decoder 238 then correspond to the specific slot to be activated as denoted by the upper 4 bits of the 16-bit I/O address, LA[15..12]. The corresponding output goes low. For example, if LA[15..12]

were equal to 1, this would indicate that slot 1 of the slots 122 should be accessed. Thus, the 1 output of the decoder 238 would then drive the input to the AND gate 232 low and the inputs to the other AND gates 220–234 would be driven high, as both the outputs of the decoder 238 would be high and the output of the AND gate 236 would be high. Thus, the only low signal going into the OR gates 204–218 would be from the AND gate 232 into the OR gate 216. Assuming AEN was low, indicating a programmed I/O or memory cycle, and assuming the other inputs to the OR gates 204—218 were low, which will be discussed later, the D1 input of the latch 202 would then be the only low input, and thus the Q1 output would be the only low output. This would thus enable slot 1 of the slots 122 by driving SSAEN[1] low.

This EISA slot specific addressing is well known in the art and is the way in which individual slots are accessed when EISA addresses are driven onto system bus 104. This does not, however, address the situation of when an ISA address is accessed. An ISA address corresponds to LA[9..8] not equaling 0. This corresponds to an ISA access to an ISA expansion board rather than to the system board. This forces the output of AND gate 236 low, forcing the corresponding outputs of AND gates 220–234 all low. Then, assuming an I/O cycle and thus AEN being low, the inputs to all of the OR gates 204–218 go low, and thus all the outputs of the latches 200 and 202 go low. This enables all of the slots 122 and the system board slot 120, allowing decoding by all the inserted boards and devices even when conflicting.

The device according to the invention improves such ISA I/O addressing and memory addressing. The third input to the OR gates 204–216 is provided by a mask register 240, which provides a series of address enable mask signals AENMSK[7..0]. The mask register 240 is typically just a series of flip-flops and is clocked by an AND gate 242, which combines the input of an I/O write signal IOWC on the system bus 104 and decoding of a particular system board I/O port address, here port 0C48h. This AND gate 242 thus goes high on an I/O write to this particular port address in the microcomputer system 100. On a write to that particular port, the values on D[7..0], bits 7 to 0 on the data lines 116, are then stored in the mask register 240. The outputs of the register 240 then drive the negation of those values as AENMSK[7..0] to the corresponding inputs of the OR gates 204–216. The input to the OR gate 218 does not include the Q1 output of the mask register 240 because that would correspond to the system board slot 120 on the system bus 104. Because only the system will access that device and because it will know what addresses the system board slot 120 uses, there should be no conflict with the system board, which decodes to LA[15..12] being zero, so the system board slot 120 never needs to be disabled.

A low value latched into the mask register 240 will cause the corresponding slot 122 to always be disabled. This is done as follows. For example, when D[3] is latched low into the mask register 240, the Q4 output of the mask register 240 output goes high, driving the OR gate 212 high at all times. Thus, the SSAEN[3] output from the latch 202 will correspondingly always be high, never allowing that slot to respond to an I/O or memory read or write command.

When all the inputs to the mask register 240 are latched high (i.e., all slots are "enabled"), this does not automatically enable all the slots 122, but instead then permits the decoder 238 in conjunction with the AND gate 236 to provide standard EISA slot selective addressing. Addresses are then decoded normally, and either all the slots 122 will be enabled for memory or ISA I/O accesses, or a single slot 122 will be enabled for EISA I/O accesses.

If the system bus 104 is an ISA bus rather than an EISA bus, then some of the circuitry shown in FIG. 2 is not needed. Specifically, the AND gates 220–234 can be eliminated, along with their associated input circuitry. This is because the system bus 104 will no longer handle EISA cards, and thus does not need the EISA slot specific addressing provided by the decoder 238. So on an ISA system, the signals SSAEN[7..0] are generated by ORing together the AEN signal with the output of the address enable mask register 240.

This selective disabling is used to help determine conflicts in memory and ISA I/O address usage and locations of cards in the ISA slots 122. During start up, it is desirable to determine if there are ISA conflicts and what space ISA boards occupy. EISA boards provide for avoiding conflicts and determining their functionality in the form of a configuration ID. The ISA standard does not provide for any corresponding determination. Further, EISA boards are typically accessed at EISA addresses, which, as has been described, are I/O slot specific. ISA accesses, on the other hand, address all of the boards. The mask register 240 provides for slot specific ISA disabling during the startup routines, allowing each board to be activated one-by-one and each of its addresses checked. More specifically, the system configuration software initially disables all but one of the installed expansion boards in the slots 122, and then determines which memory and ISA I/O addresses that board occupies. The configuration software creates a memory and I/O address map of each board and then determines whether those address maps included conflicting addresses. If so, the user can be warned or the conflict board can be disabled using the slot specific memory and I/O addressing of the invention.

In creating those address maps, the configuration software also determines the presence of devices that drive the data bus to its normally undriven value. This is discussed more fully in Ser. No. 08/145,339, entitled "Detecting the Presence of a Device on a Computer System Bus by Measuring the Response Time of Data Signals on the Bus," filed concurrently herewith, which is hereby incorporated by reference.

Once the memory and I/O address map of the expansion boards is created, the configuration software runs signature analysis routines to determine the manufacturer and function of each particular ISA board. This functionality and mapping is then passed to EISA configuration software, which sets up the device drivers and locations of specific boards. This is all discussed more fully in Serial No. 08/145,338, entitled "Method of Determining the Configuration of Devices Installed on a Computer Bus," filed concurrently herewith, and Ser. No. 07/293,315, entitled "Method and Apparatus for Configuration of Computer System and Circuit Boards," allowed May 10, 1993, which are hereby incorporated by reference.

Of course, the limitation of seven particular devices connected to the bus is only specific of the preferred embodiment, and the device or method implemented according to the invention could of course have an arbitrary number of slots each with its own address enable signal.

The foregoing disclosure and description of the invention are illustrative and explanatory, and various changes in the size, shape, materials, components, circuit elements, wiring connections and contacts, as well as in the details of the illustrated circuitry and construction and method of operation may be made without departing from the spirit of the invention.

I claim:

1. A system for disabling devices, comprising:

an expansion bus having address, data, and control lines;

a processor coupled to said expansion bus, said processor executing instructions including memory and input/output operations:

a plurality of expansion slots connected to said expansion bus, each one of said expansion slots carrying a corresponding slot specific address enable signal of a plurality of slot specific address enable signals that when at an enabling value, enables a device installed in said one of said expansion slots, and when at a disabling value, disables the device installed in said one of said expansion slots, and wherein said plurality of expansion slots are for receiving devices implemented according to a standard in which all devices installed in said plurality of expansion slots are intended to be simultaneously enabled to respond or disabled from responding to a memory or input/output operation on the expansion bus and individually each device decodes the address of the memory or input/output operation and responds if the address is in a range selected for that device;

a mask register in the system with a plurality of inputs coupled to a portion of the data lines, said mask register storing the plurality of inputs responsive to a command executed by the processor, and said mask register providing as outputs a plurality of address enable mask signals corresponding to said stored plurality of inputs;

a source of a plurality of address enable signals, wherein said source provides the plurality of address enable signals in accordance with the standard such that all of the plurality of address enable signals are simultaneously provided at slot enabling or slot disabling values responsive to memory or input/output operations directed to the expansion bus such that expansion slots in a system implemented according to the standard are all intended to be simultaneously enabled or disabled; and mask circuitry receiving said plurality of address enable signals and said plurality of address enable mask signals, said mask circuitry providing the plurality of slot specific address enable signals to the plurality of expansion slot, said mask circuitry providing each corresponding slot specific address enable signal at a device disabling value when a corresponding one of said plurality of address enable mask signals is at a first predetermined state, and said mask circuitry providing each corresponding slot specific address enable signal at a value responsive to a corresponding one of the plurality of address enable signals when said corresponding one of said plurality of address enable mask signals is at a second predetermined state.

2. The system of claim 1, wherein said mask circuitry is a series of OR gates responsive to said plurality of address enable signals and responsive to the address enable mask signals.

3. The system of claim 1, wherein said source of a plurality of address enable signals provides enabling signals when the processor executes a memory operation.

4. The system of claim 1, wherein the standard is Industry Standard Architecture.

5. A system for disabling devices on a bus having address, data, and control lines, the devices being responsive to lines for disabling the interpretation of addressing lines during both memory and input/output operations, and the system including a processor capable of executing commands and communicating with the bus, where the system has a system board and the bus has slots for devices, and where the bus has n address lines, with a given state of an upper p bits of a lower m bits indicating a device is addressed as part of the system board and other states of the p bits indicating a device installed in one of the plurality of slots is addressed, where p is less than m which is less than n, the system comprising:

a mask register in the system with a plurality of inputs coupled to a portion of the data lines, said mask register storing the plurality of inputs responsive to a command executed by the processor, and said mask register providing as outputs a plurality of address enable mask signals corresponding to said stored plurality of inputs;

means for providing a plurality of address enable signals, said means for providing a plurality of address enable signals comprising:

means for determining the state of the upper p bits of the lower m bits of the n address lines;

means for determining the state of r bits of the n addressing lines where the r bits are higher than the lower m bits, wherein the r bits may indicate the system board or one of the plurality of slots;

means for rendering the system board responsive to one of the lines for disabling the interpretation of addressing lines;

means for rendering one of the slots responsive to a second of the lines for disabling the interpretation of addressing lines; and means responsive to the means for determining the state of the upper p bits and the means for determining the state of the r bits for providing an enabling signal to the lines for disabling the interpretation of addressing lines when the p bits are in a first predetermined state and for providing enabling or disabling signals to the lines for disabling the interpretation of addressing lines when the p bits are in a second predetermined state, providing the enabling or disabling signals responsive to the means for determining the state of the r bits; and means for masking in the system said address enable signals, said means for masking receiving said plurality of address enable signals and said plurality of address enable mask signals, and providing a slot specific address enable signal to the bus for at least one of the devices, said means for masking providing the slot specific address enable signal at a device disabling value when a corresponding one of said plurality of address enable mask signals is at a first predetermined state, and said means for masking providing the slot specific address enable signal at a value responsive to a corresponding one of the plurality of address enable signals when said corresponding one of said plurality of address enable mask signals is at a second predetermined state.

6. The system of claim 5, wherein said means for providing a plurality of address enable signals provides enabling signals when the processor executes a memory operation.

7. The system of claim 5, wherein said means for masking is a series of OR gates responsive to said means for providing a plurality of address enable signals and responsive to the address enable mask signals.

8. The system of claim 5, wherein said means responsive to the means for determining the state of the upper p bits and the means for determining the state of the r bits includes a decoder responsive to the means for determining the state of the upper p bits.

9. The system of claim 8, wherein said means for providing a plurality of address enable signals provides enabling signals when the processor executes a memory operation.

10. The system of claim 8, wherein m is 10, p is 2, and r is 4.

11. A method for disabling devices in a system having;

an expansion bus having address, data, and control lines;

a processor coupled to said expansion bus, said processor executing instructions including memory and input/ output operations;

a plurality of expansion slots connected to said execution bus, each one of said expansion slots carrying a corresponding slot specific address enable signal of a plurality of slot specific address enable signals that when at an enabling value enables a device installed in said one of said expansion slots, and when at disabling value, disables the device installed in said one of said expansion slots, and wherein said plurality of expansion slots are for receiving devices implemented according to a standard in which all devices installed in said plurality of expansion slots are intended to be simultaneously enabled to respond or disabled from responding to a memory or input/output operation on the expansion bus and individually each device decodes the address of the memory or input/output operation and responds if the address is in a range selected for that device;

a mask register in the system with a plurality of inputs coupled to a portion of the data lines, and mask register storing the plurality of inputs responsive to a command executed by the processor, and said mask register providing as outputs a plurality of address enable mask signals corresponding to said stored plurality of inputs;

the method comprising steps of:

storing in the mask register a plurality of signals responsive to a command executed by the processor, providing from the mask register a plurality of address enable mask signals corresponding to said storing signals;

providing in the system a plurality of address enable signals complying with a standard such that all of the plurality of address enable signals are simultaneously provided at slot enabling or slot disabling values responsive to memory or input/output operations directed to the bus such that expansion slots in a system implemented according to the standard are all simultaneously enabled or disabled;

masking in the system said address enable signals responsive to said providing a plurality of address enable signals and said providing plurality of address enable mask signals; and providing a plurality of slot specific address enable signals to the expansion slots at device disabling or enabling values responsive to said masking said address enable signals such that each of said slot specific address enable signals is provided at a slot disabling value if a corresponding one of the address enable mask signals is at a first state and is provided at a value corresponding to a corresponding one of the address enable signals if the corresponding one of the address enable mask signals is at a second state.

12. A system disabling devices, comprising:

an expansion bus having address, data, and control lines;

a processor coupled to said expansion bus, said processor executing instructions including memory and input/ output operations;

a video subsystem coupled to said processor for displaying video data;

a plurality of expansion slots connected to said expansion bus, each one of said expansion slots carrying a corresponding slot specific address enable signal of a plurality of slot specific address enable signals that, when at an enabling value, enables a device installed in said one of said expansion slots, and when at a disabling value, disables the device installed in said one of said expansion slots, and wherein said plurality of expansion slots are for receiving devices implemented according to a standard in which all devices installed in said plurality of expansion slots are intended to be simultaneously enabled to respond or disabled from responding to a memory or input/output operation on the expansion bus and individually each device decodes the address of the memory or input/output operation and responds if the address is in a range selected for that device;

a mask register in the system with a plurality of inputs coupled to a portion of the data lines, said mask register storing the plurality of inputs responsive to a command executed by the processor, and said mask register providing as outputs a plurality of address enable mask signals corresponding to said stored plurality of inputs;

a source of a plurality of address enable signals, wherein said source provides the plurality of address enable signals in accordance with the standard such that all of the plurality of address enable signals are simultaneously provided at slot enabling or slot disabling values responsive to memory or input/output operations directed to the expansion bus such that expansion slots in a system implemented according to the standard are all intended to be simultaneously enabled or disabled; and mask circuitry receiving said plurality of address enable signals and said plurality of address enable mask signals, said mask circuitry providing the plurality of slot specific address enable signals to the plurality of expansion slots, said mask circuitry providing each corresponding slot specific address enable signal at a device disabling value when a corresponding one of said plurality of address enable mask signals is at a first predetermined state, and said mask circuitry providing each corresponding slot specific address enable signal at a value responsive to a corresponding one of the plurality of address enable signals when said corresponding one of said plurality of address enable mask signals is at a second predetermined state.

13. The system of claim 12, wherein said mask circuitry is a series of OR gates responsive to said plurality of address enable signals and responsive to the address enable mask signals.

14. The system of claim 12, wherein said source of a plurality of address enable signals provides enabling signals when the processor executes a memory operation.

15. The system of claim 12, wherein the standard is Industry Standard Architecture.

* * * * *

UNITED STATES PATENT AND TRADEMARK OFFICE
CERTIFICATE OF CORRECTION

PATENT NO. : 5,594,879
DATED : 1/14/97
INVENTOR(S) : BRIAN V. BELMONT

It is certified that error appears in the above-identified patent and that said Letters Patent is hereby corrected as shown below:

At column 9, line 6, after "operations", please delete ":" and replace it with ";".

At column 9, line 10, after "that", please insert ",".

At column 11, line 9, after "having", please delete ";" and replace it with ":".

At column 11, line 14, please delete "execution" and replace it with "expansion".

At column 11, line 17, after "that", please insert ",".

At column 11, line 18, after "value", please insert ",".

At column 11, line 40, after "processor", please delete "," and replace it with ";".

Signed and Sealed this

Eighth Day of April, 1997

Attest:

BRUCE LEHMAN

*Attesting Officer*　　*Commissioner of Patents and Trademarks*